(12) United States Patent
Miyatani

(10) Patent No.: US 6,934,541 B2
(45) Date of Patent: Aug. 23, 2005

(54) COMMUNICATION DEVICE

(75) Inventor: Tetsuhiko Miyatani, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 679 days.

(21) Appl. No.: 09/955,983

(22) Filed: Sep. 20, 2001

(65) Prior Publication Data

US 2002/0128007 A1 Sep. 12, 2002

(30) Foreign Application Priority Data

Mar. 1, 2001 (JP) .......................................... 2001-056365

(51) Int. Cl.7 ............................................... H04Q 7/20

(52) U.S. Cl. ..................... 455/423; 455/424; 455/67.11

(58) Field of Search ............................. 455/423, 424, 455/67.1, 561; 342/174, 372, 173, 703, 708

(56) References Cited

FOREIGN PATENT DOCUMENTS

GB 2342505 A * 4/2000 ............ G01R/29/10

* cited by examiner

Primary Examiner—Melur Ramakrishnaiah
(74) Attorney, Agent, or Firm—Wenderoth, Lind & Ponack, L.L.P.

(57) ABSTRACT

A communication device for transmitting and/or receiving signals by using a communication antenna includes signal characteristic information detection means for detecting information regarding signal characteristics of a calibration signal which are contained in a signal received by the communication antenna, calibration means for calibrating a communication antenna chain based on the detected signal characteristic information, and cancellation signal generating means for generating a cancellation signal corresponding to a calibration signal contained in the signal received by the communication antenna based on the calibration signal. The device also includes signal cancellation-by-subtraction means for subtracting the generated cancellation signal from the signal received by the communication antenna, and receive signal processing means for processing the received signal that is diminished by the cancellation signal.

19 Claims, 6 Drawing Sheets

COMMUNICATION DEVICE

BACKGROUND OF THE INVENTION

1. Field of the Invention

The present invention relates to a communication device, typically a receiver, that conducts wireless communication by, for example, DS-CDMA (direct sequence-code division multiple access) using an adaptive array antenna, and more particularly, to a technology for improving calibration accuracy at the time of calibrating communication antenna chains and for improving the reception quality of received signals.

2. Description of the Prior Art

In recent years, consideration has been given to CDMA transceiver circuits that utilize adaptive array antennas (AAAs).

When an adaptive array antenna is used to receive and transmit signals, its multiple antenna elements are individually weighted to control the directivity of the overall antenna. At the time of signal reception, for example, the adaptive array antenna is controlled so as to achieve maximum directivity in the direction of the desired incoming wave and to strongly depress received signal quality with respect to signals from other directions. This type of control operation is conducted by using a control algorithm which is provided in the communication device.

FIG. 5 shows calculated antenna directivity patterns of an adaptive array antenna. Specifically, the pattern designated (a) is an example in which the maximum directivity has been adjusted to 0 degrees for the reception of an incoming wave from the 0-degree direction, and the pattern designated (b) is an example in which the maximum directivity as been adjusted to 45 degrees for the reception of an incoming wave from the 45-degree direction. For reference, FIG. 5 also shows the directivity component in the 180-direction that is the opposite direction from 0 degrees, and the −45-degree direction that is the opposite direction from 45 degrees.

When received signal processing is conducted by using an adaptive array antenna to control directivity in this manner, the received signal processing can be conducted while eliminating interference waves arriving from directions which are different from the arrival direction of the desired signal. The adaptive array antenna has therefore drawn considerable attention as a technology for eliminating interference.

The foregoing explanation regarding directivity during reception also applies to the directivity and interference removal effect during transmission, except that special measurement is required.

The special measurement that is required for an adaptive array antenna during transmission will now be explained.

This special measurement is called "calibration." Calibration is for correcting phase and amplitude deviation that arises in transmission and reception chains including antennas and in the individual devices making up the chains owing to variations occurring during manufacture.

This will be explained with reference to a specific problem. Assume, for example, that based on phase that is calculated from receiver output varying in phase and amplitude (gain), a mobile station is detected in the direction of 45 degrees as viewed from a base station. At transmission, the directivity of the adaptive array antenna should be adjusted to be maximum in the direction of 45 degrees. If the transmitter section has not been calibrated, however, it is actually impossible to impart high antenna directivity in the 45-degree direction because phase differences and level differences (amplitude differences) are present in the individual antenna chains. Moreover, if the receiver section has not been calibrated, the detection of the mobile station in the 45-degree direction cannot be relied on from the start. The end result is that the transmit directivity will be adjusted to a direction which is different from the direction where the mobile station is located.

Types of communication antenna chain calibration include, for example, receive calibration for correcting phase and amplitude deviation between antenna chains when receiving signals using communication antenna chains, transmit calibration for correcting phase and amplitude between antenna chains when transmitting signals using a communication antenna chains, and receive/transmit calibration for correcting phase/amplitude deviation with respect to a single communication antenna chain between the case where the communication antenna chain is used to receive signals and the case where the communication antenna chain is used to transmit signals.

The importance of communication antenna chain calibration is obvious from the attention it has received in, for instance, "Indoor transmission characteristics of adaptive antenna-array transmission diversity in W-CDMA downlink, Harada et al., Technical Report of The Institute of Electronics, Information and Communication Engineers, RCS99-18 (1999-05)," "Study on RF transmission and reception circuit calibration in W-CDMA downlink adaptive antenna-array transmission diversity, Harada, Tanaka, Sawabashi and Adachi, Technical Report of The Institute of Electronics, Information and Communication Engineers, RCS99-101 (1999-08)" (hereinafter "Reference 1"), and "Automatic calibration method for FDD system adaptive array that takes antenna characteristics into account," Nishimori, Osa, Takatori and Hori, Technical Report of The Institute of Electronics, Information and Communication Engineers, RCS99-213, MW99-233 (2000-02) (hereinafter "Reference 2").

Reference 1 reports, among other matters, that the relative amplitude/phase deviation between RF receiver units and between RF transmitter units is substantially constant irrespective of signal transmission power and reception power.

Reference 2 reports, among other matters, that since a DBF (digital beam forming) configuration is generally adopted to use the baseband for adaptive array antenna directivity control, calibration of amplitude ratio and phase differences between the antenna branches arising in the RF section etc. and of the differences between receive chain and transmission chain is required to realize ideal transmission and reception patterns, that device amplitude/phase characteristics vary over time with changes in environment and temperature, and that in FDD (frequency division duplex), the fact that the transmit frequency and receive frequency differ necessitates the calibration of the antenna cable (such antenna cable calibration being actually required when installing the equipment).

A CDMA base station equipped with both an adaptive array antenna and a calibration information analyzer will now be explained.

FIG. 6 is a block diagram showing one configuration of such a CDMA base station. The CDMA base station is equipped with n number of communication (transmission/reception) antennas L1–Ln constituting an adaptive array antenna, n number of transceiver units (TRX) M1–Mn, and n number of calibration information CAL information) analyzers N1–Nn. The antennas L1–Ln, transceiver units M1–Mn and calibration information analyzers N1–Nn are combined in sets so as to form n number of communication antenna chains. The CDMA base station is also equipped with a user-segregated AAA signal processor and discriminator 78 which is common to the n number of communication antenna chains. The symbol n designates an integer greater than 1.

The transceiver units M1–Mn are all the same in configuration and operation. The transceiver unit M1, for instance, comprises a receiver unit including a mixer 71, an attenuator 72, a directional coupler 73, a frequency converter 74 and an orthogonal detector 75. The structural particulars of the transceiver units M1–Mn are not illustrated and will not be explained here.

The calibration information analyzers N1–Nn are all the same in configuration and operation. The CAL information analyzer N1, for instance, includes a despreader 76 and a phase/gain error detector 77.

The antennas L1–Ln receive and transmit spread spectrum signals from and to mobile stations (users).

The transceiver units M1–Mn carry out receive and transmit processing. In receive processing, the frequency converters 74 frequency-convert (down-convert) the received signals which are received from the antennas L1–Ln from the carrier frequency band (radio frequency (RF) band in this example) to an intermediate frequency (IF) band, and the orthogonal detectors 75 effect orthogonal detection to the baseband frequency band and output the orthogonal detection results to the calibration information analyzers N1–Nn.

In transmit processing, orthogonal modulators (not shown) orthogonally modulate transmit signals which are received from the calibration information analyzers N1–Nn from the baseband frequency band to the intermediate frequency band, and frequency converters (not shown) frequency-convert (up-convert) the results of the orthogonal modulation to the carrier frequency band and output the results to the antennas L1–Ln.

The calibration information analyzers N1–Nn detect phase and amplitude deviations that are caused by the transmission and reception chains and devices, and carry out calibration based on the detection results.

The user-segregated AAA signal processor and discriminator 78 conducts transmit and receive processing. In receive processing, the user-segregated AAA signal processor and discriminator 78 acquires the received signals of the communication antenna chains from the calibration information analyzers N1–Nn, multiplies these signals and receive weights (weighting coefficients) that are applied to the communication antenna chains and synthesizes the multiplication results for all communication antenna chains so as to produce a synthesis result that is a received signal of the adaptive array antenna, where this processing is done for every mobile station. The user-segregated AAA signal processor and discriminator 78 then demodulates the received signals, discriminates their data, and outputs the so-obtained user-specific data (individual user data) for X number of users. X can be singular or plural. X is equal to, for example, the number of mobile stations from which the CDMA base station is simultaneously receiving signals.

In transmit processing, the user-segregated AAA signal processor and discriminator 78 modulates user-specific data for X' number of users, sums the modulated signals to produce transmit signals, multiplies the transmit signals and transmit weights that are applied to the communication antenna chains, and outputs the multiplication results for the respective communication antenna chains to the transceiver units M1–Mn via the calibration information analyzers N1–Nn. X' can be singular or plural. X' is equal to, for example, the number of mobile stations to which the CDMA base station simultaneously transmits signals.

The mixer 71, attenuator 72, directional coupler 73, despreader 76 and phase/gain error detector 77 are circuit components provided for calibration. These circuit components do not operate when calibration is not an objective.

The operation of the transceiver unit M1 and the CAL information analyzer N1 will be explained by way of example.

The communication antenna L1 receives a signal that is transmitted by a mobile station (a signal that is a basic object of the reception; hereinafter sometimes called "object signal") and signals that are transmitted by other communication antennas L2–Ln (other communication antenna transmit signals).

The mixer 71 produces a signal of a frequency which is equal to the frequency difference (transmit/receive difference frequency) between the signal of frequency f1 that is transmitted from the CDMA base station to a mobile station and the signal of frequency f2 of the signal that is transmitted from the mobile station to the CDMA base station (i.e., the signal the CDMA base station receives from the mobile station), converts the frequency f1 of the other communication antenna transmit signals which are contained in the received signal to the frequency f2 of the object signal, and outputs the converted other communication antenna signals to the attenuator 72.

The attenuator 72 attenuates the other communication antenna transmit signals that are received from the mixer 71 and outputs the attenuated other communication antenna transmit signals to the directional coupler 73. The power of the communication antenna transmit signals is reduced by attenuation because the power of signals which are transmitted from the CDMA base station to the mobile station is much greater than the power of signals which are received by the CDMA base station from mobile stations. That is, the power of the communication antenna transmit signals is attenuated in order to avoid the great difference in power that would arise if the other communication antenna transmit signals should be mixed with the object signal received without reducing their power level.

The directional coupler 73 receives the other communication antenna signals from the attenuator 72, mixes them with the incoming received signal from the communication antenna L1, and outputs the mixed signal to the frequency converter 74.

The mixed signal that is output by the directional coupler 73 is processed as explained above by the frequency converter 74 and the orthogonal detector 75, and is output to the CAL information analyzer N1.

The despreader 76 receives the received signal from the transceiver unit M1, uses spreading codes which are associated with the other communication antenna transmit signals that are contained in the received signal so as to despread (demodulate) the other communication antenna transmit signals, and outputs the result of the despreading to the phase/gain error detector 77.

Based on the despread result received from the despreader 76, the phase/gain error detector 77 detects the phase deviations and gain deviations of the other communication antenna transmit signals that are indicated by the despread result.

The foregoing procedure enables the detection of the mutual phase and gain deviations (errors) among the antennas L1–Ln. When, for example, the communication antenna L1 is used exclusively for receiving and the signals that are transmitted from the communication antenna L2 and the communication antenna L3 are received by the communication antenna L1 and their deviations are detected, the deviations between the communication antenna L2 and the communication antenna L3 can be acquired.

However, in a conventional CDMA base station that conducts calibration, such as that shown in FIG. 6, the fact that transmission is conducted at high power during system operation makes it difficult to secure an adequate dynamic range in the calibration circuits which are provided in the transceiver units M1–Mn, particularly in the mixer 71. Moreover, the conventional CDMA base station also has other problems, such as that the attenuator 72 has to be controlled according to the system state and that the transceiver units M1–Mn are structurally complex.

Moreover, during operation of the conventional CDMA base station, high-power signals from the other communication antennas get mixed in with the received signal. This degrades the reception quality of the object signal from the mobile station (hereinafter called "Problem A").

One conceivable method of coping with Problem A would be, for example, to divide the transmit signal that is transmitted from the other communication antennas, send the divided signals to the communication antenna that receives the transmit signal, and use the deviation which is obtained from the phase/gain error detector 77 of the communication antenna chain concerned and the divided signals so as to remove the other communication antenna transmit signals from the received signal in the calibration information analyzer N1. However, as mentioned above, since the large transmission power occurring during system operation makes it difficult to secure an adequate dynamic range, detection of the exact value and removal would become extremely difficult during operation. Moreover, since the number of transceiver units depends on the n number of antennas making up the adaptive array antenna, the transceiver unit configuration would become complex and greatly increase equipment cost. Furthermore, the transceiver units cannot readily be miniaturized or decreased in cost by large scale integration (LSI) or like technologies because they are analog units.

The present invention was made in light of the foregoing shortcomings of the prior art. One object of the invention is to provide a communication device which enables enhanced calibration accuracy and improved reception quality of communication signals when calibration is effected during the transmission and reception of signals using a communication antenna. Another object of the invention is to provide a communication device that eliminates the need for an attenuator (such as the attenuator 72), enables the detection of calibration information using a low-power signal, achieves simplification of the transceiver unit structure, and enables reduction of the equipment size and cost.

SUMMARY OF THE INVENTION

The present invention achieves these objects by providing a communication device that performs the following processing during the transmission and reception of signals using a communication antenna.

Signal characteristic information detection means detects information regarding the signal characteristics of a calibration signal which is contained in a signal that is received by the communication antenna, and calibration means calibrates a communication antenna chain based on the detected signal characteristic information. In this process, cancellation signal generating means generates a cancellation signal corresponding to a calibration signal which is contained in the signal that is received by the communication antenna based on the calibration signal, signal cancellation-by-subtraction means subtracts (removes) the generated cancellation signal from the signal that is received by the communication antenna, and receive signal processing means processes the received signal which is diminished by the cancellation signal or a signal substantially identical to the calibration signal.

Since calibration is therefore performed by not using a signal that is transmitted/received by the communication device or the like but by using the calibration signal, the calibration accuracy can be enhanced. Moreover, as the processing is effected on the received signal after the received signal has been diminished by the cancellation signal corresponding to the received calibration signal, the reception quality of communication signals is improved.

Any of various types of antennas can be used in various numbers. For example, either a single antenna or multiple antennas can be used.

In addition, multiple antennas can be used in any number of various antenna array configurations.

The calibration signal used can be of any various types. For example, use of a signal whose phase and amplitude are fixed as the calibration signal is preferable because such a signal enables an improvement in calibration accuracy over the conventional use of a calibration signal that varies in phase and amplitude.

The information regarding the signal characteristics of the calibration signal is detected information which is required for performing calibration of the communication antenna chain. For instance, the relative phase deviation and amplitude deviation of the communication antenna chain or, for instance, the absolute phase deviation value and amplitude deviation value of the communication antenna chain can be used as the information.

The cancellation signal can be produced in any number of various ways. As one example, the cancellation signal can be produced by generating a signal which is identical to a predefined calibration signal and producing the cancellation signal by using the signal characteristics of the received calibration signal so as to correct the generated signal.

Although the cancellation signal is preferably identical to the received calibration signal, the cancellation signal can vary from the received calibration signal to some degree insofar as the variation is within the range of practical utility.

The subtraction of the cancellation signal from the received signal amounts to removing, from the received signal, a signal which is identical or substantially identical to the calibration signal contained therein.

The processing of the received signal which is performed by the receive signal processing means can be any number of various types. For example, the processing can be demodulation processing or the like of the received signal.

In one aspect of the present invention, the communication device of the present invention is equipped with a calibration signal transmitting antenna for transmitting a calibration signal to the communication antenna.

The provision of a dedicated antenna for transmitting the calibration signal raises the calibration efficiency.

The calibration signal transmitting antenna is preferably located within a short distance from the communication antenna. When the calibration signal transmitting antenna is located within a short distance from the communication antenna, the power of the calibration signal which is transmitted by the calibration signal transmitting antenna can be reduced so as to reduce the interference that the calibration signal imparts to the communication signal. This improves the reception quality of the communication signal.

In another aspect of the present invention, the communication device is equipped with calibration signal transmitting means for transmitting a calibration signal from a communication antenna to a calibration signal receiving antenna for receiving the calibration signal that is transmitted from the communication antenna. The signal characteristic information detection means detects information regarding the signal characteristics of the calibration signal that is received by the calibration signal receiving antenna, and the calibration means calibrates the communication antenna chain based on the detected signal characteristic information.

Calibration can therefore be performed based on the calibration signal that is received from the communication antenna. In a preferred arrangement, a single antenna is used in common for the calibration signal receiving antenna and the calibration signal transmitting antenna.

Antennas used for calibration, e.g., the calibration signal transmitting antenna and the calibration signal receiving antenna, can be installed at any number of various locations. A preferred arrangement when multiple communication antennas are arrayed in a circle is to locate them at the center of the circle. A preferred arrangement when multiple communication antennas are arrayed linearly is to locate them between the communication antennas. When multiple communication antennas are used, the individual communication antennas and the antennas for calibration are preferably disposed in such a manner so as to be equidistance from one another.

In another aspect of the present invention, the communication device is equipped with a signal generator for generating a signal of a prescribed frequency for converting a signal frequency, and the frequency signal that is generated by the signal generator is supplied to multiple antenna chains including all of the communication antenna chains.

Therefore, since a frequency signal that is generated by a common signal generator performs frequency conversion of signals which are supplied to multiple antenna chains, unlike the case of using different signal generators for the individual antenna chains, for example, no phase shift arises in the frequency signal between the antenna chains. This improves the calibration accuracy.

The frequency conversions effected include, for instance, frequency conversions between RF frequency and IF frequency (hereinafter "frequency conversions A") and frequency conversions between IF frequency and baseband frequency (hereinafter "frequency conversions B").

For example, when frequency conversions A and frequency conversions B are performed, one signal generator can be used in common for the frequency conversions A, and another signal generator can be used in common for the frequency conversions B. Alternatively, one signal generator can be used in common for both frequency conversions A and B.

Further, a single signal generator can be used for multiple antenna chains including all of the communication antenna chains or, preferably, a single signal generator can be used in common for all of the communication antenna chains and calibration antenna chains.

In another aspect of the present invention, the communication device is configured so that the signal characteristic information detection means detects information regarding signal characteristics of a calibration signal which is received via a communication antenna at intervals.

Compared with the case where this processing (detection) is performed constantly, this configuration shortens the time period during which the calibration signal is contained in the received signal to thereby improve the reception quality of communications signals. Moreover, by also shortening the time period for transmitting the calibration signal, this configuration further improves the transmission quality of communication signals which are transmitted to other parties.

The intervals can be set to any number of various time periods. For example, the aforesaid processing can be performed intermittently at regular intervals.

The communication antenna chain calibration can, for instance, be one or more of receive calibration among multiple communication antennas, transmit calibration among multiple communication antennas, and transmit/receive calibration between the transmission and reception of a single communication antenna.

DETAILED DESCRIPTION OF THE PREFERRED EMBODIMENTS

First Embodiment

A CDMA base station according to a first embodiment of the present invention will now be explained with reference to the drawings.

The processing when using a communication antenna to receive and transmit communication signals in the first embodiment is similar to what was explained earlier with reference to FIG. 6 regarding the prior art. In the following, therefore, only the points that characterize the CDMA base station of this embodiment will be explained in detail and points similar to those set out with reference to the prior art example of FIG. 6 will be omitted or discussed only briefly.

Figure 1:
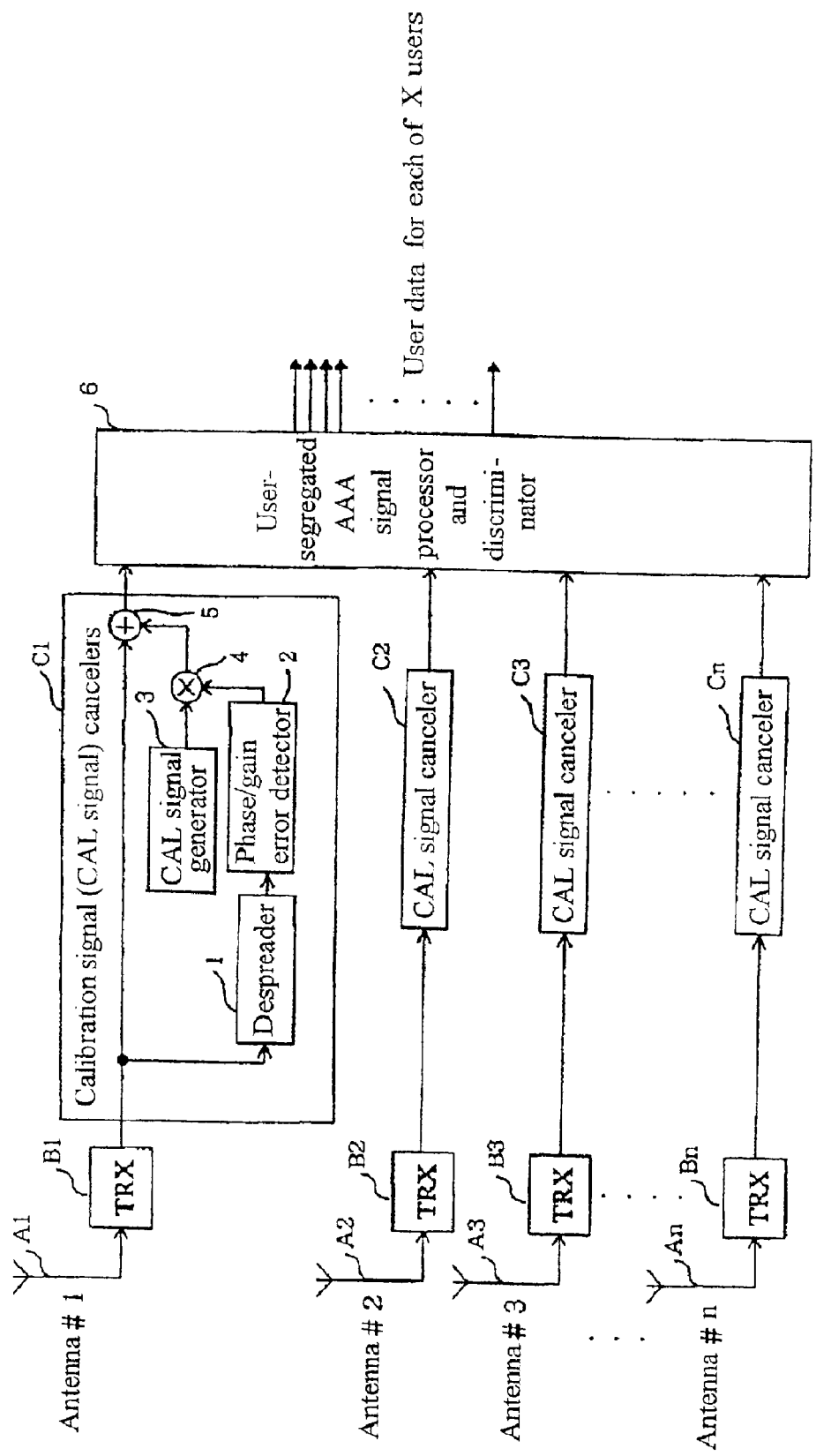
FIG. 1 is a block diagram showing the configuration of a CDMA base station according to a first embodiment of the present invention.

FIG. 1 shows the configuration of the CDMA base station of the first embodiment. The CDMA base station comprises n number of communication (transmission/reception) antennas A1–An constituting an adaptive array antenna, n number of transceiver units (TRX) B1–Bn, and n number of calibration signal (CAL signal) cancellers C1–Cn. The communication antennas A1–An, transceiver units B1–Bn and CAL signal cancellers C1–Cn are combined in sets so as to form n number of communication antenna chains. The CDMA base station is also equipped with a user-segregated AAA signal processor and discriminator 6 which is common to the n number of communication antenna chains. The symbol n designates an integer greater than 1.

The transceiver units B1–Bn are all the same in configuration and operation.

The CAL signal cancellers C1–Cn are all the same in configuration and operation. The CAL signal canceller C1, for instance, comprises a despreader 1, a phase/gain error detector 2, a CAL signal generator 3, a complex multiplier 4 and a subtracter 5.

The first embodiment includes a transmit side for the wireless transmission of the calibration signal. Since the present invention does not particularly limit the transmit side, however, the transmit side has been omitted from the drawings.

In the first embodiment, the transmit side and the receive side (CDMA base station) use a known fixed spreading code signal as the calibration signal. The transmit side transmits such a calibration signal and the receive side receives the calibration signal. Further, in the first embodiment, the frequency of the calibration signal is the same as the frequency f2 of the signals that are transmitted from the mobile stations to the CDMA base station (i.e., the signals the CDMA base station receives from the mobile stations).

The communication antennas A1–An transmit and receive spread spectrum signals to and from the mobile stations (users) over the airwaves.

The transceiver units B1–Bn conduct receive processing and transmit processing. In receive processing, the transceiver units B1–BN frequency-convert and orthogonally detect received signals coming in from the communication antennas A1–An and output the result of the orthogonal detection to the CAL signal cancellers C1–Cn.

In transmit processing, the transceiver units B1–BN orthogonally modulate and frequency-convert transmit signals that are received from the CAL signal cancellers C1–Cn and output the results to the communication antennas A1–An.

The CAL signal cancellers C1–Cn acquire the received signals of the communication antenna chains from the transceiver units B1–Bn and detect the phase and amplitude deviations which are produced by the transmission and reception chains and devices based on the calibration signal that is contained in the received signals, thereby enabling calibration based on the detection results.

The CAL signal cancellers C1–Cn also remove the calibration signal that is contained in the received signals of the communication antenna chains coming in from the receiver units B1–Bn, and output the received signals having the calibration signal or a substantially identical signal removed therefrom to the user-segregated AAA signal processor and discriminator 6.

The user-segregated AAA signal processor and discriminator 6 conducts transmit and receive processing. In receive processing, the user-segregated AAA signal processor and discriminator 6 acquires the received signals of the communication antenna chains that are outputted from the CAL signal cancellers C1–Cn, multiplies these signals and receive weights (weighting coefficients) which are applied to the communication antenna chains and synthesizes the multiplication results for all communication antenna chains so as to produce a synthesis result that is a received signal of the adaptive array antenna, where this processing is done for every mobile station. The user-segregated AAA signal processor and discriminator 6 then demodulates the received signals, discriminates their data, and outputs the so-obtained user-specific data (individual user data) for X number of users. X can be singular or plural. X is equal to, for example, the number of mobile stations from which the CDMA base station is simultaneously receiving signals.

In transmit processing, the user-segregated AAA signal processor and discriminator 6 modulates user-specific data for X' number of users, sums the modulated signals so as to produce transmit signals, multiplies the transmit signals and transmit weights which are applied to the communication antenna chains, and outputs the multiplication results for the respective communication antenna chains to the transceiver units B1–Bn via the CAL signal cancellers C1–Cn. X' can be singular or plural. X' is equal to, for example, the number of mobile stations to which the CDMA base station simultaneously transmits signals.

An example of the processing that is conducted by the individual CAL signal cancellers C1–Cn will now be explained with reference to FIG. 2, taking the CAL signal canceller C1 as an example.

In the first embodiment, calibration of the communication antenna chains is performed so as to correct for variation in phase and gain (amplitude) arising in the communication antennas A1–An, variation in phase and gain arising in the wiring between the communication antennas A1–An and the receiver units B1–Bn, and variation in phase and gain arising in the receiver units B1–Bn.

In the first embodiment, the calibration is not required to reduce the phase deviation and gain deviation among the communication antenna chains and the like to zero (0). It suffices, for example, to reduce the phase deviation and gain deviation between transmission and reception in a single communication antenna chain. In other words, the absolute phase deviation values and gain deviation values of the communication antenna chains need not necessarily be made zero and it suffices for the relative phase deviation and gain deviation to be made zero.

A method of detecting theoretical phase variation and gain variation caused by an antenna arrangement will be explained with reference to FIG. 2.

Figure 2:
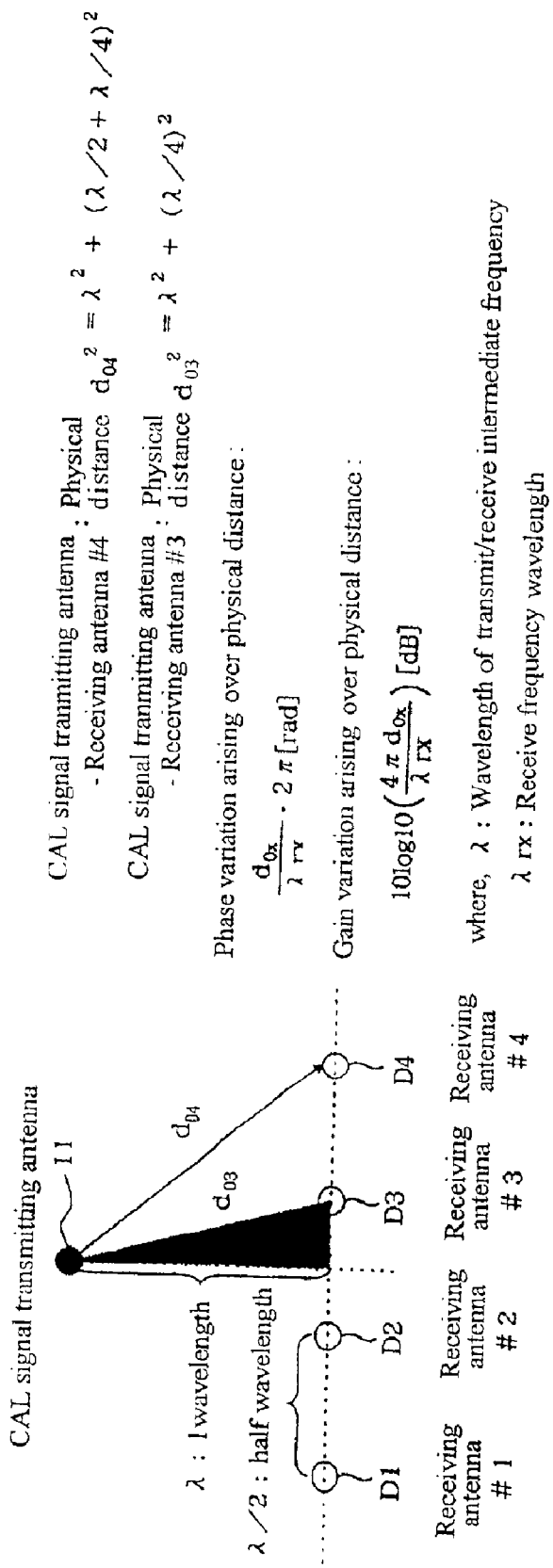
FIG. 2 is diagram for explaining a method of detecting theoretical phase variation and gain variation caused by an antenna arrangement.

FIG. 2 shows four communication antennas D1–D4 which are used for communication and an external calibration signal (CAL signal) transmitting antenna 11 which is used for transmitting a calibration signal. The communication antennas D1–D4 are linearly arrayed at regular spacing of one half the transmit/receive intermediate frequency wavelength $\ddot{e}(\lambda)$, i.e., at a regular spacing of $\ddot{e}/2$. The CAL signal transmitting antenna 11 is disposed on a line that perpendicularly bisects the line segment connecting the communication antennas D2 and D3. The perpendicular distance between the line segment and the CAL signal transmitting antenna 11 is equal to the intermediate frequency wavelength.

The CAL signal transmitting antenna 11 radiates the same calibration signal toward all of the communication antennas D1–D4.

The calibration signal P that is received by the communication antenna chain of communication antenna Dx (x=1–4) provided in, for example, a CDMA base station is expressed by:

$$\tilde{N} = e^{\tilde{e}TX} \cdot \varsigma_{TRX0} \cdot e^{\tilde{e}TRX0} \cdot \hat{a}_{air0x} \cdot e^{\tilde{e}air0x} \cdot \hat{a}_{feederx} \cdot e^{\tilde{e}feederx} \cdot \hat{a}_{TRXx} \cdot e^{\tilde{e}TRXx} \quad \text{(Eq.1)}$$

$e^{\tilde{e}TX}$ in this equation designates the phase of the calibration signal, $\varsigma_{TRX0}$ designates the gain variation that is imparted to the transmitter transmitting the calibration signal, $e^{j\tilde{e}TRX0}$ designates the phase variation that is imparted to the transmitter transmitting the calibration signal, $\tilde{a}_{air0x}$ designates the power loss (gain variation) arising in the wireless transmission path from the CAL signal transmitting antenna 11 to the communication antenna Dx, $e^{j\tilde{e}air0x}$ designates the phase variation arising in the wireless path from the CAL signal transmitting antenna 11 to the communication antenna Dx, $\tilde{a}_{feederx}$ designates the loss (gain variation) that is caused by the feeder line from the communication antenna Dx to the transceiver unit of the communication antenna Dx chain, $e^{j\tilde{e}feederx}$ designates the phase variation that is caused by the feeder line from the communication antenna Dx to the transceiver unit of the communication antenna Dx chain, $\tilde{a}_{TRXx}$ designates the gain variation that is caused by the receive operation of the transceiver unit of the communication antenna Dx chain, and $e^{j\tilde{e}TRXx}$ designates the phase variation that is caused by the receive operation of the transceiver unit of the communication antenna Dx chain.

The received calibration signal P represented by Eq. 1 is sent to the CAL signal canceller C1, which processes the received calibration signal P in the following manner.

The despreader 1 acquires the received signal from the communication antenna Dx, despreads the received signal by using a spreading code corresponding to the calibration signal, thereby detecting the calibration signal P that is contained in the received signal, and outputs the detection result (despreading result) to the phase/gain error detector 2.

The phase/gain error detector 2 first detects the phase variation and gain variation of the calibration signal P represented by Eq. 1 based on the detection result received from the despreader 1.

When the positional relationship between the CAL signal transmitting antenna 11 and the communication antenna Dx is known, the components $\tilde{a}_{air0x}$ and $e^{j\tilde{e}air0x}$ of the calibration signal P represented by Eq. 1, which are respectively caused by phase variation and gain variation arising in the transmission path (space), can be determined by calculation.

Specifically, the phase variation Z1 that is caused by the physical length of the transmission path can be represented by Eq. 2 using the ratio between the physical length and the wavelength rx of the receive frequency. The gain variation Z2 that is caused by the physical length of the transmission path can be represented by a free space loss equation as in Eq. 3.

$$Z1 = (d0x/\ddot{e}rx) \cdot 2\partial \text{ [rad]} \qquad \text{(Eq.2)}$$

$$Z2 = 10 \log 10\{(4\partial \cdot d0x)/\ddot{e}rx\} \text{ [dB]} \qquad \text{(Eq.3)}$$

In Eq. 2 and Eq. 3, d0x represents the physical distance between the CAL signal transmitting antenna 11 and the communication antenna Dx (x=1–4). In the case of communication antennas D4 (x=4) and D3 (x=3), for example, d0x can be expressed by Eq. 4 and Eq. 5, respectively.

$$(d04)^2 = \ddot{e}^2 + (\ddot{e}/2 + \ddot{e}/4)^2 \qquad \text{(Eq.4)}$$

$$(d03)^2 = \ddot{e}^2 + (\ddot{e}/4)^2 \qquad \text{(Eq.5)}$$

Moreover, since the phase of the calibration signal is set in advance in the first embodiment, the uncertain phase/gain variation components in the calibration signal P of Eq. 1 are those caused by the calibration signal transmitter, the feeder lines, and the fixed difference of the transceiver unit, so that rewriting to detection error P' as shown by Eq. 6 is possible.

$$\tilde{N} = \zeta_{TRX0} \cdot e^{j\tilde{e}TRX0} \cdot \tilde{a}_{feeder4} \cdot e^{j\tilde{e}feeder4} \cdot \tilde{a}_{TRX4} \cdot e^{j\tilde{e}TRX4} \qquad \text{(Eq.6)}$$

P' represented by Eq. 6 can be obtained from P represented by Eq. 1 by subjecting P to conjugate complex multiplication of the calibration signal phase $e^{j\tilde{e}TR}$, which is known on the transmit side and the receive side, and by carrying out an operation on P to correct the phase deviation which is dependent on the carrier wave frequency indicated by Eq. 2 and the gain deviation which is caused by free space loss indicated by Eq. 3. When these operations are performed with respect to the communication antenna chains of the communication antennas D1–D4, the phase/gain deviation (error) of each communication antenna chain is obtained in the form of the calibration signal containing the components which are produced by the phase/gain variation of the transmitter.

One of the multiple communication antenna chains is then defined as a reference, the differences between the phase deviation and gain deviation of the reference communication antenna chain and the phase deviations and gain deviations of the other communication antenna chains are calculated, and phase correction coefficients and gain correction coefficients for making the differences zero are calculated for the individual communication antenna chains. By then applying the so-obtained communication antenna chain correction coefficients to the signals that are received by the communication antenna chains, the relative values of the phase variations and gain variations produced by the communication antennas D1–D4, the transceiver units etc. can be made zero. The correction processing (calibration) using the correction coefficients is conducted, for example, by the user-segregated AAA signal processor and discriminator 6.

The foregoing method does not ultimately remove the phase/gain variations which are produced by the calibration signal transmitter or remove the phase/gain variations of the communication antenna chain used as a reference. However, this is not a particular problem because, as was pointed out above, in an adaptive array antenna, for example, only the relative phase/gain variation differences among the communication antenna chains are important and the absolute values of the communication antenna chain phase/gain variations are not required.

The phase/gain error detector 2 deletes the phase component of the calibration signal that is produced on the calibration signal transmission side from the received calibration signal represented by Eq. 1, and outputs the result after deletion to the complex multiplier 4.

The CAL signal generator 3 generates a signal exactly identical to the calibration signal that is transmitted from the calibration signal transmission side and outputs the generated signal to the complex multiplier 4.

The complex multiplier 4 complex-multiplies the result after deletion received from the phase/gain error detector 2 and the generated signal received from the CAL signal generator 3, and outputs the multiplication result to the subtracter 5 as a cancellation signal. Ideally, the multiplication result (cancellation signal) which is output to the subtracter 5 from the CAL signal generator 3 is identical or substantially identical to the calibration signal contained in the signal that is received by the communication antenna chain of the communication antenna A1.

The subtracter 5 subtracts the cancellation signal that is received from the complex multiplier 4 from the received signal of the communication antenna A1 chain which is input thereto by the transceiver unit B1, and outputs the received signal after subtraction to the user-segregated AAA signal processor and discriminator 6. Ideally, the signal which is output to the user-segregated AAA signal processor and discriminator 6 from the subtracter 5 is what is obtained by removing the calibration signal from the received signal containing the communication signal and cancellation signal output by the transceiver B1. The subtraction between the two signals can be achieved by, for example, adding the two signals in an adder after the phase of one of them has been inverted 180 degree.

Owing to the removal of the calibration signal from the received signals of the communication antenna chains by the CAL signal cancellers C1–Cn in this manner, the effect of the interference that the calibration signal imparts to signals which are transmitted from mobile stations to the CDMA base station (the object signals) can be mitigated.

Although transmit signals used as calibration signals are known to the art, it has remained extremely difficult to effect averaging with respect to phase/gain error over long time periods because the transmit phase and transmit amplitude (transmit information) vary in real time. In contrast, since the transmit phase and transmit amplitude of the calibration signal of the first embodiment are constant, the calibration signal phase/gain error can be averaged over a long period even when, for example, detection accuracy is affected by noise and/or interference. As a result, detection accuracy can be enhanced.

While the first embodiment was described with respect to a configuration that does not monitor the signal which is output by the subtracter 5, a configuration can also be adopted in which the signal which is output by the subtracter 5 is monitored and adaptive control is effected so as to minimize the average power of the signal. Such minimization of average power can be considered equivalent to maximizing the removal of the calibration signal from the received signal.

No explanation was made with respect to the first embodiment regarding timing adjustment of the processing that is conducted in the various processing units. In the actual physical circuitry, however, fine timing adjustment is carried out, such as with respect to the processing done by the CAL signal cancellers C1–Cn.

As explained in the foregoing, the CDMA base station of the first embodiment enables enhanced calibration accuracy in transceivers having multiple communication antennas A1–An by operating the user-segregated AAA signal processor and discriminator 6 so as to extract mobile station signals (user signals) from signals which are received by the communication antennas A1–An, conducting adaptive array antenna synthesis and data discrimination through signal processing on an individual user basis, and outputting receive data for X number of users, and, further, by, when generating transmit signals for X' number of users, performing calibration using a calibration signal whose phase and amplitude are constant.

The first embodiment exemplifies a case of receive-calibrating an adaptive array antenna. Specifically, as was explained above, a calibration signal that is transmitted from a single antenna is received by all of the communication antennas A1–An and calibration of each communication antenna chain relative to the others is conducted based on the phase/gain variation of the received calibration signal.

Moreover, in the CDMA base station of the first embodiment, the received signals of the communication antenna chains are subjected to received data detection and other such processing after the calibration signal which is contained in the received signals has been removed. The level of the interference that the communication signals from the mobile station (the object signals) receive from the calibration signal can therefore be reduced. This improves the reception quality of the communication signals.

Figure 5:
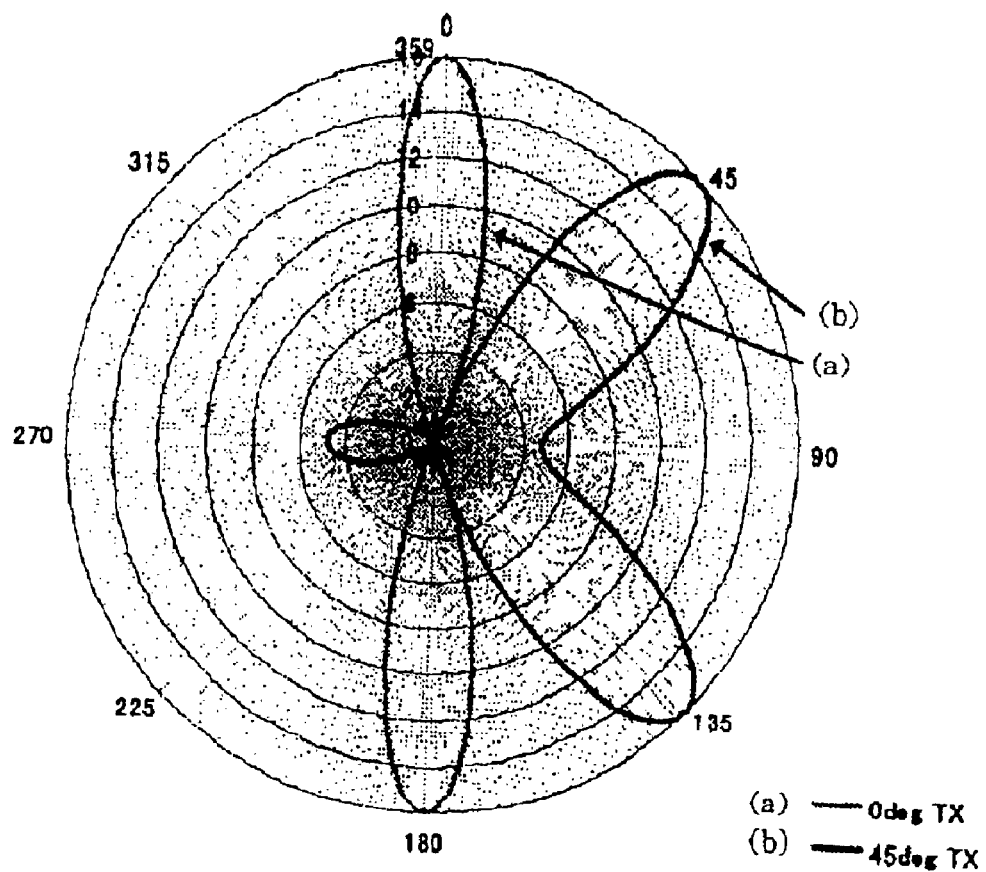
FIG. 5 shows an example of receive directivity patterns of an adaptive array antenna.

Further, in the CDMA base station of the first embodiment, the transceiver units do not need to be pro-vided with attenuators like the attenuator 72 shown in FIG. 5 relating to the prior art. The transceiver units can therefore be simplified in structure and reduced in unit cost. This enables the provision of compact equipment at a low price.

In the first embodiment, the despreader 1 and phase/gain error detector 2 constitute the signal characteristic information detection means of the present invention, the user-segregated AAA signal processor and discriminator 6 constitutes the calibration means of the present invention, the despreader 1, phase/gain error detector 2, CAL signal generator 3 and complex multiplier 4 constitute the calibration signal generating means of the present invention, the subtracter 5 constitutes the signal cancellation-by-subtraction means (calibration signal cancellation means) of the present method, and the user-segregated AAA signal processor and discriminator 6 constitutes the receive signal processing means of the present invention.

Second Embodiment

A CDMA base station according to a second embodiment of the present invention will now be explained with reference to FIG. 3.

Figure 3:
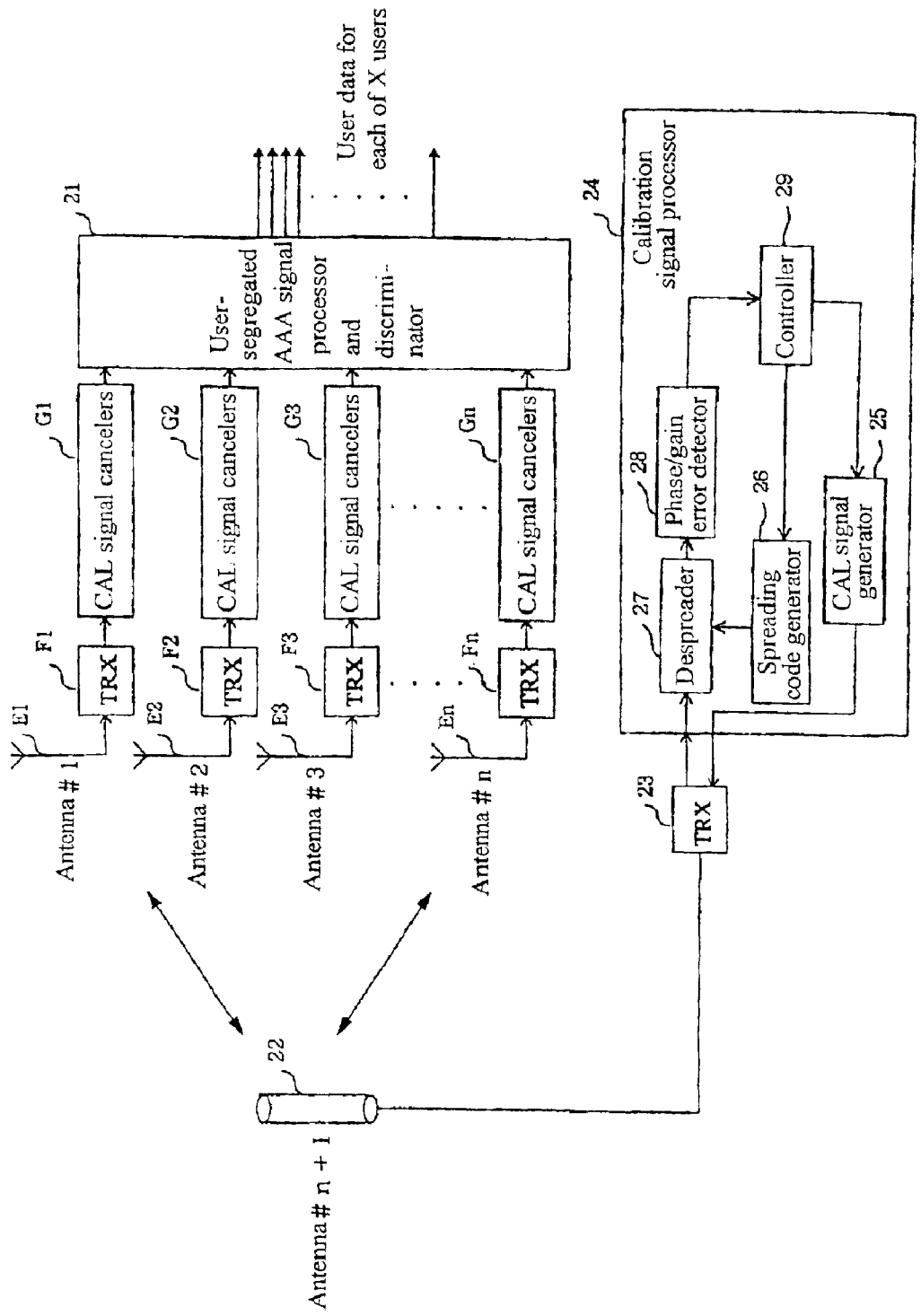
FIG. 3 is a block diagram showing the configuration of a CDMA base station according to a second embodiment of the present invention.

FIG. 3 shows the configuration of the CDMA base station of the second embodiment. The second embodiment differs from the first embodiment of FIG. 1 in that, for example, it is provided with calibration signal transmitting capability. Constituent elements similar to those of the first embodiment include n number of communication (transmit/receive) antennas E1–En constituting an adaptive array antenna, D number of transceiver units (TRX) F1–Fn, n number of calibration signal (CAL signal) cancellers G1–Gn. Similar to the first embodiment, the communication antennas E1–EN, transceiver units F1–FN and CAL signal cancellers G1–GN are combined in sets so as to form n number of communication antenna chains. The CDMA base station of the second embodiment is also equipped with a user-segregated AAA signal processor and discriminator 21 which is common to the n number of communication antenna chains. The symbol n designates an integer greater than 1.

As characterizing the constituent elements, the CDMA base station of the second embodiment further comprises a calibration signal (CAL signal) transmitting/receiving antenna 22, calibration signal (CAL signal) transceiver unit 23, and calibration signal (CAL signal) processor 24. The CAL signal processor 24 is equipped with a CAL signal generator 25, a spreading code generator 26, a despreader 27, a phase/gain error detector 28 and a controller 29.

The CAL signal transmitting/receiving antenna 22 is, for example, installed near the communication antennas E1–En and is, for example, disposed so as to be spaced from all of the communication antennas E1–En by the same physical distance. It should be noted that the CAL signal transmitting/receiving antenna 22 can be located according to the system state, for example, and can be disposed in any number of various ways. Generally, the distance between each of the communication antennas E1–En and the CAL signal transmitting/receiving antenna 22 is on the order of several wavelengths.

The CAL signal transmitting/receiving antenna 22 radio-transmits a calibration signal which is input thereto from the CAL signal transceiver unit 23. The CAL signal transmitting/receiving antenna 22 outputs signals which are received by radio transmission to the CAL signal transceiver unit 23.

The CAL signal transceiver unit 23, CAL signal processor 24 and other elements of the calibration chain transceiver are located very close to the CDMA base station, e.g., inside or within several centimeters of the CDMA base station.

The CAL signal transceiver unit 23 receives the calibration signal from the CAL signal processor 24, orthogonally modulates and frequency-converts the calibration signal, and outputs the modulated and converted calibration signal to the CAL signal transmitting/receiving antenna 22. The CAL signal transceiver unit 23 also acquires received signals from the CAL signal transmitting/receiving antenna 22, frequency-converts and orthogonally detects the received signal, and outputs the result of the orthogonal detection to the CAL signal processor 24.

The frequencies of the signals which are transmitted and received by the CAL signal transceiver unit 23 are reversed from the frequencies of the signals which are transmitted and received by the transceiver units F1–Fn of the communication antenna chains. The CAL signal transceiver unit 23 transmits and receives signals of the same frequency as the mobile stations. In other words, if the transceiver units F1–Fn transmit signals of frequency f1 and receive signals of f2, the CAL signal transceiver unit 23 transmits signals of frequency f2 and receives signals of frequency f1.

In this case, the frequency of the calibration signals that are transmitted from the communication antenna chains to the CAL signal transmitting/receiving antenna 22 is f1, and transmit calibration of the communication antenna chains is performed by using these calibration signals. On the other hand, the frequency of the calibration signal that is transmitted from the CAL signal transmitting/receiving antenna 22 to the communication antennas E1–En is f2, and receive calibration of the communication antenna chains is performed by using this calibration signal.

The mobile communication system equipped with the CDMA base station of the second embodiment uses W-CDMA (wideband CDMA). The frequency f1 of signals which are transmitted from the CDMA base station to the mobile stations and the frequency f2 of the signals which are transmitted from the mobile stations to the CDMA base station are therefore different.

Figure 6:
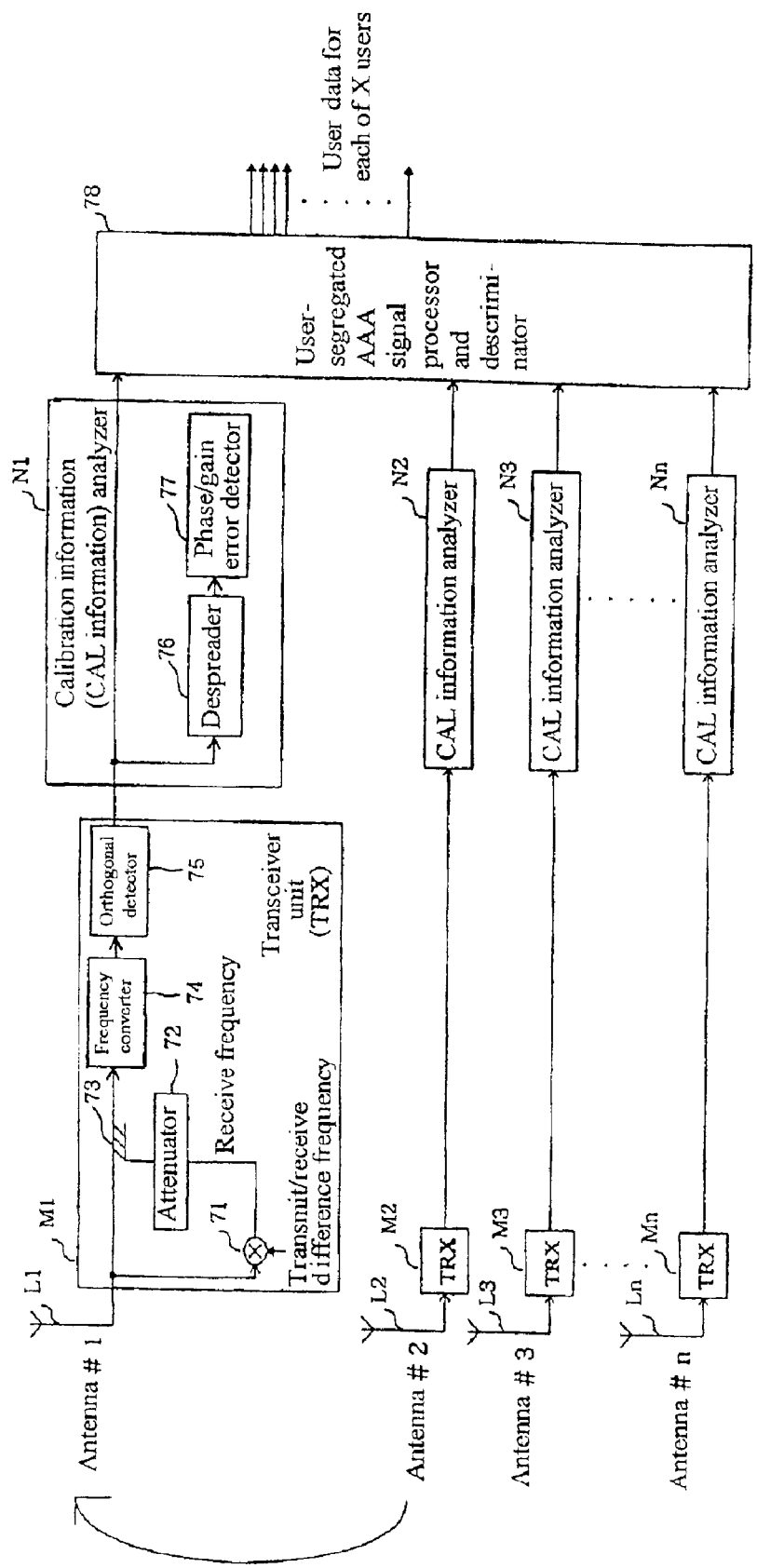
FIG. 6 is block diagram showing the configuration of a conventional CDMA base station.

When such a difference between higher and lower frequencies is dealt with by using the transmit side configuration of a conventional CDMA base station such as the one shown in FIG. 6, the configuration becomes complex owing to the need for frequency conversion.

Although the power of the communication signals which are transmitted by the transceiver units F1–Fn is large, the power of the calibration signal which is transmitted by the CAL signal transceiver unit 23 can be very small because the power of the transmitted calibration signal only needs to be large enough to ensure that the radiated wave reaches the communication antennas E1–En which are located near the CAL signal transmitting/receiving antenna 22.

The signals that the CAL signal transceiver unit 23 receives from the communication antennas E1–En have a very high power level because the communication antennas E1–En are located close to the CAL signal transmitting/receiving antenna 22. The CAL signal transceiver unit 23 is therefore not required to carry out received signal amplification of the type that would be necessary should the power of the received signals below.

Therefore, since the transmission power of the CAL signal transceiver unit 23 can be made small and amplification of the received signals is not required, the CAL signal transceiver unit 23 can be implemented at a lower cost than, for example, the transceiver units F1–Fn.

An example of the operation of the CAL signal processor 24 will now be explained so as to exemplify how the receive calibration of the communication antenna chains is performed.

In the transmission system of the CAL signal processor 24, the CAL signal generator 25 operates under the control of the controller 29 so as to generate a fixed spreading code as a calibration signal, and outputs the calibration signal to the CAL signal transceiver unit 23.

Next, the calibration signal that is output by the CAL signal generator 25 is radiated toward the communication antennas E1–En by the CAL signal transmitting/receiving antenna 22. The communication antenna chains in this case use a common calibration signal. The calibration chain constituted by the CAL signal transmitting/receiving antenna 22, the CAL signal transceiver unit 23 and the CAL signal processor 24 transmits a common calibration signal to all of the communication antennas E1–En simultaneously.

An example of the operation of the CAL signal processor 24 will now be explained so as to exemplify how the transmit calibration of the communication antenna chains is performed.

In transmit calibration, the communication antennas E1–En of the communication antenna chains in turn transmit calibration signals to the CAL signal transmitting/receiving antenna 22. The calibration chain receives the calibration signals from the communication antenna chains and processes the received calibration signals so as to carry out calibration.

Specifically, in transmit calibration, the phase/gain deviations arising in the paths of the communication antenna chains when signals are transmitted from the CDMA base station to the mobile stations are detected and corrected. The communication antenna chains are capable of transmitting, from the communication antennas E1–En, a spreading code (one not used in the mobile communication system incorporated in the CDMA base station) constituting a calibration signal, and they in turn transmit calibration signals. In other words, when a calibration signal is transmitted from communication antenna Ey (y=1–n), the other communication antennas do not transmit calibration signals.

In the reception system of the CAL signal processor 24 during transmit calibration, the controller 29 instructs the spreading code generator 26 to generate a spreading code corresponding to the received calibration signal, and the spreading code generator 26 operates under the control of the controller 29 so as to generate, for example, a spreading code which is defined as a scramble code that is unique to the base station concerned and outputs the generated spreading code to the despreader 27.

The despreader 27 correlates the received signal coming in from the CAL signal transceiver unit 23 and the spreading code that is supplied by the spreading code generator 26, and outputs the despreading result that is obtained by using the scramble code to the phase/gain error detector 28.

The phase/gain error detector 28 detects the phase variation and gain variation of the calibration signal based on the despreading result which is received from the despreader 27.

The signal that is sent from the CAL signal transceiver unit 23 to the CAL signal processor 24 contains the communication signals which are transmitted from the communication antennas E1–En to a number of different mobile stations and the calibration signal that is emitted from a single communication antenna Ey. Owing to the orthogonal principle of CDMA, however, the despreading by the despreader 27 extracts only the calibration signal. As a result, the phase/gain error detector 28 can detect the phase/gain variation of the communication antenna chain that transmitted the calibration signal.

Similar to the first embodiment, the second embodiment also corrects the gain variation that is caused by free space loss and the phase variation that are attributable to the physical distance between the communication antennas E1–En and the CAL signal transmitting/receiving antenna 22.

Further, to be more specific, when transmit calibration is performed, the received calibration signal Q from the communication antenna chain of the communication antenna Ez (z=1–n) obtained by the CAL signal processor 24 can be expressed by Eq. 7.

$$Q = e^{j\tilde{\varepsilon}TX} \cdot \hat{a}_{airz0} \cdot e^{j\tilde{\varepsilon}airz0} \cdot \hat{a}_{feederz} \cdot e^{j\tilde{\varepsilon}feederz} \cdot \tilde{a}_{TRXz} \cdot e^{j\tilde{\varepsilon}TRXz} \cdot \varsigma_{TRX0} \cdot e^{j\tilde{\varepsilon}TRX0} \quad \text{(Eq.7)}$$

$e^{j\tilde{\varepsilon}TX}$ in this equation designates the phase of the calibration signal that is transmitted from the communication antennas E1–En, $\hat{a}_{airz0}$ designates the power loss (gain variation) arising in the wireless transmission path from the communication antenna Ez to the CAL signal transmitting/receiving antenna 22, $e^{j\tilde{\varepsilon}airz0}$ designates the phase variation arising in the wireless path from the communication antenna Ez to the CAL signal transmitting/receiving antenna 22, $\hat{a}_{feederz}$ designates the loss (gain variation) that is caused by the feeder line from the communication antenna Ez to the transceiver unit Fz of the communication antenna Ez chain, $e^{j\tilde{\varepsilon}feederz}$ designates the phase variation that is caused by the feeder line from the communication antenna Ez to the transceiver unit Fz of the communication antenna Ez chain, $\tilde{a}_{TRXz}$ designates the gain variation that is caused by the transmit operation of the transceiver unit Fz of the communication antenna Ez chain, $e^{j\tilde{\varepsilon}TRXz}$ designates the phase variation that is caused by the transmission operation of the transceiver unit Fz of the communication antenna Ez chain, $\varsigma_{TRX0}$ designates the gain variation that is imparted to the receiver of the CAL signal transceiver unit 23 receiving the calibration signal, and $e^{j\tilde{\varepsilon}TRX0}$ designates the phase variation that is imparted to the receiver of the CAL signal transceiver unit 23 receiving the calibration signal.

By acquiring a received calibration signal Q like that shown in FIG. 7 from every communication antenna E1–En, the CAL signal processor 24 detects the phase/gain variation of every communication antenna chain.

Similar to what was explained in connection with the first embodiment, it is not necessary to remove the absolute values of the phase/gain variation, i.e., normal operation as an adaptive array antenna can be ensured by removing the relative values among the antennas. For example, it is possible to define one of the communication antenna chains as a reference, calculate the relative values of the differences between the phase/gain deviations of the reference communication antenna chain and the other communication antenna chains, and complex-multiply the signals of the individual communication antenna chains by correction coefficients in the user-segregated AAA signal processor and discriminator 21 so as to eliminate the differences, and thus eliminate the relative differences among the communication antenna chains.

As the calibration signals are nothing but interference to the mobile stations, the transmission power of the calibration signals is preferably set at a low value within the transmission power range enabling practically effective calibration. From this viewpoint as well, the distances between the communication antennas E1–En and the CAL signal transmitting/receiving antenna 22 are preferably made short.

As explained in the foregoing, in the CDMA base station of the second embodiment, the receiver/transmitter including the multiple communication antennas E1–En is equipped with a calibration chain add-on composed of the CAL signal transmitting/receiving antenna 22 etc. The calibration chain transmits the same calibration signal to n number of communication antennas E1–En so as to perform receive calibration of the communication antenna chains. The calibration chain detects calibration signals transmitted by, for example, p number of communication antenna chains, detects the phase variation and amplitude variation of the received calibration signals, and carries out transmit calibration. Since it is therefore possible to detect information for calibration by using calibration signals of low power, the level of interference that is imparted to the mobile stations from the CDMA base station during transmit calibration can therefore be suppressed. p is a natural number satisfying $1 \geq p \geq n$.

In the second embodiment, the CAL signal transmitting/receiving antenna 22 constitutes the calibration signal transmitting antenna and the calibration signal receiving antenna of the present invention, and the transceiver units F1–Fn constitute the calibration signal transmitting means of the present invention.

The despreaders and phase/gain error detectors of the CAL signal cancellers G1–Gn, and the spreading code generator 26, the despreader 27 and the phase/gain error detector 28 of the CAL signal processor 24 constitute the signal characteristic information detection means of the present invention, and the user-segregated AAA signal processor and discriminator 21 constitutes the calibration means of the present invention.

Third Embodiment

A CDMA base station according to a third embodiment of the present invention will now be explained with reference to FIG. 4.

The explanation of the third embodiment will be extended to include configurational details of the transceiver units of the communication antenna chains discussed regarding the first and second embodiments and configurational details of the CAL signal transceiver unit of the second embodiment. For simplicity of description, the third embodiment will be explained with reference to a configuration having an adaptive array antenna comprising four communication antennas H1–H4.

Figure 4:
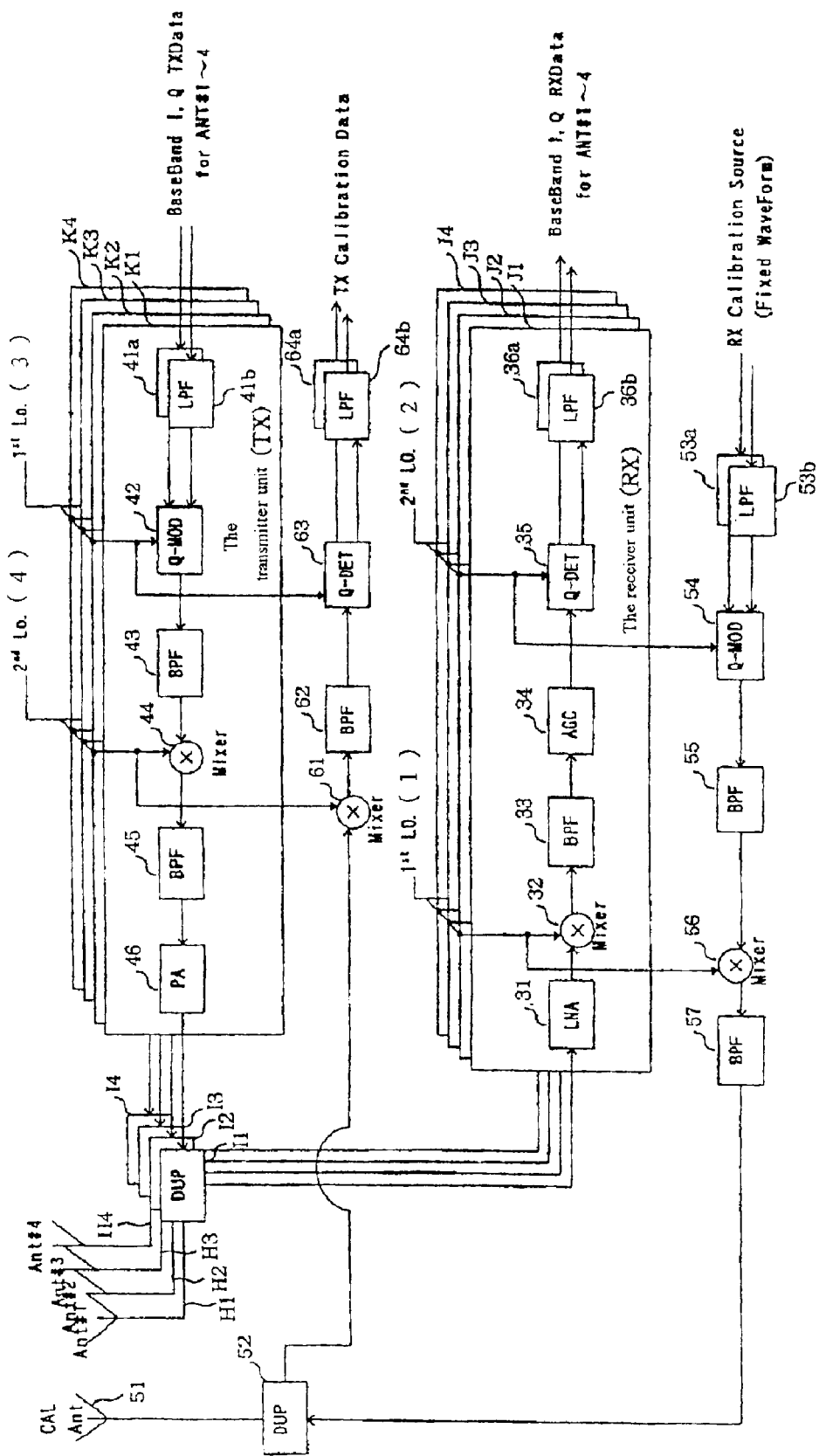
FIG. 4 is a block diagram showing the configuration of a CDMA base station according to a third embodiment of the present invention.

The configuration of the CDMA base station of the third embodiment is shown in FIG. 4. This CDMA base station is equipped with four communication (transmission and reception) antennas H1–H4 constituting an adaptive array antenna, four duplexers (DUP) I1–I4 that function to separate the transmission/reception chains by filtering, four receiver (RX) units J1–J4 and four transmitter units K1–K4. In the fourth embodiment, the communication antennas H1–H4, duplexers I1–I4, receiver units J1–J4, transmitter units K1–K4 and CAL signal cancellers (not shown) constitute the communication antenna chains.

The receiver units J1–J4 are all the same in configuration and operation. The receiver unit J1, for instance, comprises a low noise amplifier (LNA) 31, a mixer 32, a band pass filter (BPF) 33, an auto gain controller (AGC) 34, an orthogonal detector (Q-DET) 35, and two low pass filters 36a, 36b.

The transmitter units K1–K4 are all the same in configuration and operation. The receiver unit K1, for instance, comprises two low pass filters (LPF) 41a, 41b, an orthogonal modulator (Q-MOD) 42, a band pass filter 43, a mixer 44, a band pass filter 45, and a power amplifier (PA) 46 which is used as a transmission amplifier.

As constituent elements that are used in common by the transmitter units K1–K4 and the receiver units J1–J4 of the calibration chain, the CDMA base station of the third embodiment is further equipped with a calibration signal (CAL signal) transmitting/receiving antenna 51 and a duplexer 52, with a calibration chain transmitter unit comprising two low pass filters 53a, 53b, an orthogonal modulator 54, a band pass filter 55, a mixer 56 and a band pass filter 57, and with a calibration chain receiver unit comprising a mixer 61, a band pass filter 62, an orthogonal detector 63, and two low pass filters 64a, 64b.

In the third embodiment, each group of circuit members of the communication antenna chains and the calibration chain that require identical local frequency signals is supplied with a local frequency signal which is generated by a common signal generator. Specifically, the mixers 32 of the communication antenna chains and the mixer 56 of the calibration chain are supplied with a receive side first local frequency signal which is generated by a common first signal generator (not shown), and the orthogonal detectors 35 of the communication antenna chains and the orthogonal modulator 54 of the calibration chain are supplied with a receive side second local frequency signal which is generated by a common second signal generator (not shown).

Similarly, the orthogonal modulators 42 of the communication antenna chains and the, orthogonal detector 63 of the calibration chain are supplied with a transmit side first local frequency signal which is generated by a common third signal generator (not shown), and the mixers 44 of the communication antenna chains and the mixer 61 of the calibration chain are supplied with a transmit side second local frequency signal which is generated by a common fourth signal generator (not shown).

The operation of the transmitter unit of the calibration chain will be explained first.

In the calibration chain transmitter unit, spreading codes of fixed signal waveforms are generated in the baseband section as an I component calibration signal and a Q component calibration. The I component and Q component calibration signals are removed of unnecessary band components by the low pass filters 53a, 53b and the I component and Q component calibration signals after the removal are sent to the orthogonal modulator 54, where they are up-converted to the IF frequency band by orthogonal modulation by using the receive side second local frequency signal. While the third embodiment is explained with respect to orthogonal modulation in the analog domain, orthogonal modulation in the digital domain is also usable.

In the calibration chain transmitter unit, the orthogonal modulation result from the orthogonal modulator 54 is removed of unnecessary band components by the band pass filter 55 and the orthogonal modulation result after the removal is sent to the mixer 56, where the post-removal orthogonal modulation result is up-converted to RF frequency f2 by using the receive side first local frequency signal. The up-converted orthogonal modulation result is removed of unnecessary band components by the band pass filter 57, and the orthogonal modulation result after the removal is sent through the duplexer 52 so as to be radiated from the CAL signal transmitting/receiving antenna 51.

The physical distance between the CAL signal transmitting/receiving antenna 51 and the communication antennas H1–H4 is short—short enough, for example, that calibration signals of sufficient level reach the communication antennas H1–H4 even without providing a power amplifier in the transmitter unit of the calibration chain and using the power amplifier to amplify the calibration signals to be transmitted.

Taking the communication antenna chain of the communication antenna H1 as an example, the operation of the receiver unit J1 of this communication antenna chain will now be explained.

The calibration signal and communication signal which are received by the antenna H1 pass through the duplexer I1 to the receiver unit J1, where the signal is amplified in level by the low noise amplifier 31, the amplified signal is down-converted from RF frequency f2 to the IF frequency band in the mixer 32 by using the receive side first local frequency signal, the down-converted signal is removed of unnecessary band components by the band pass filter 33, and the signal after the removal is sent to the auto gain controller 34, which adjusts the post-removal signal to the optimum level for supply to the next stage, namely, the orthogonal detector 35 or an A/D (analog-to-digital) converter (not shown).

In the receiver unit J1, the output signal from the auto gain controller 34 is orthogonally detected into baseband I component and Q component signals by the orthogonal detector 35 by using the receive side second local frequency signal, and the I component and Q component of the orthogonal detection are removed of unnecessary band components by the low pass filters 36a, 36b. As a result, bandpass signals, namely, an I component calibration signal, a Q component calibration signal and a communication signal, are obtained.

Taking communication antenna chain of the communication antenna H1 as an example, the operation of the transmitter unit K1 of this communication antenna chain will now be explained.

In the transmitter unit K1 of the communication antenna chain, the baseband signals, i.e., the I component and Q component calibration signals and the communication signal, which are the signals to be transmitted, are removed of unnecessary band components by the low pass filters 41a, 41b, and the I component and Q component signals after the removal are up-converted to the IF frequency band in the orthogonal modulator 42 by orthogonal modulation by using the transmit side first local frequency signal. While the third embodiment is explained with respect to orthogonal modulation in the analog domain, orthogonal modulation in the digital domain is also usable.

In the transmitter unit K1 of the communication antenna chain, the orthogonal demodulation result from the orthogonal modulator 42 is removed of unnecessary band components outside the desired band by the band pass filter 43, the orthogonal modulation result after the removal is up-converted to RF frequency f1 by the mixer 44 by using the transmit side second local frequency signal, and the up-converted orthogonal modulation result is removed of unnecessary band components by the band pass filter 45. The orthogonal modulation result after the removal is then power-amplified by the power amplifier 46 so that the communication signal radio waves will reach the entire service area of the CDMA base station, and the amplified signal is sent through the duplexer I1 so as to be radiated by the communication antenna H1.

The operation of the receiver unit of the calibration chain will now be explained.

The calibration signal (among other signals) that is received by the CAL signal transmitting/receiving antenna 51 passes through the duplexer 52 to the receiver unit of the calibration chain, where the received signal is down-converted from the RF frequency f1 to the IF frequency band by the mixer 61 by using the transmit side second local frequency signal, the down-converted signal is removed of unnecessary band components by the band pass filter 62, and the signal after the removal is orthogonally detected by the orthogonal detector 63 by using the transmit side first local frequency signal so as to down-convert the post-removal signal to baseband I component and Q component signals.

In the receiver unit of the calibration chain, the I component and Q component orthogonal detection results from the orthogonal detector 63 are removed of unnecessary band components by the low pass filters 64a, 64b, thereby obtaining baseband signals including the I component and Q component calibration signals.

The physical distance between the CAL signal transmitting/receiving antenna 51 and the communication antennas H1–H4 is short—short enough, for example, that calibration signals of a sufficient level are obtained even without, for example, providing a low noise amplifier ahead of the mixer 61 of the receiver unit of the calibration chain and using the amplifier to amplify the received calibration signal.

The third embodiment was explained with respect to a configuration not being equipped with an auto gain controller located, for example, between the band pass filter 62 and the orthogonal detector 63 of the receiver unit of the calibration chain. When such an auto gain controller is installed, it is necessary, for example, to fix its gain value or to control the auto gain controller with a controller (not shown) so that automatic correction of the level differences of the signals from the communication antennas H1–H4 is not performed.

As explained above, in the third embodiment, each of the receive side first local frequency signal, receive side second local frequency signal, transmit side first local frequency signal, and transmit side second local frequency signal supplied to the mixers, orthogonal modulators and orthogonal detectors is used in common between the communication antenna chains and the calibration chain. The importance of this will be explained.

In the calibration of the third embodiment, the phase variations and amplitude variations of the communication antenna chains are absorbed. These variations are caused by the RF frequency and the IF frequency.

Assume that the transmitter units K1–K4 of the communication antenna chains each uses an independent local frequency signal source (oscillator) and the frequency of the signals which are generated by the sources are synchronized by PLL (phase locked loop). In this case, the RF frequencies of the signals which are radiated from the communication antennas H1–H4 will coincide but their phases will not. Although the oscillators used in a CDMA base station are highly accurate, phase shift will inevitably occur over the course of time.

Although it might be possible to absorb such a phase shift by, for example, frequently performing calibration, this would lead to needless calibrations being done. Moreover, minute phase changes that cannot be detected by the phase/gain error detector may frequently occur.

In the third embodiment, therefore, the source of the receive side first local frequency signal, the source of the receive side second local frequency signal, the source of the transmit side first local frequency signal, and the source of the transmit side second local frequency signal are used in common for all antenna chains so as to avoid the foregoing problem. Although differences among the communication antenna chains produce phase differences, these phase differences are of fixed values and therefore do not vary with time. Moreover, even if oscillator fluctuation should cause slight phase and frequency variation, calibration does not need to be performed because the relative deviation among the antenna chains is zero. The third embodiment therefore lowers the frequency of calibration.

In addition, cases may arise in which the operator installing the CDMA base station wants to know not the relative values of phase variation and amplitude variation among the communication antenna chains but the absolute values of the phase variation and amplitude variation of the individual communication antenna chains. When different oscillators are used for the local frequency signals of the calibration chain and the communication antenna chains, however, the absolute values cannot be obtained. The reason for this is that when the phase error is detected, for example, it is impossible to distinguish between (1) the case where the phase error of the communication antenna chain is zero and the phase error was detected owing to phase variation of the calibration chain and (2) the case where the phase error of the calibration chain is zero and the phase error was detected owing to phase variation of the communication antenna chain. When the transmitter and receiver units of the communication antenna chains and the calibration chain each uses a completely independent oscillator, detection of the absolute value of the phase deviation is realistically impossible.

As explained in the foregoing, in the CDMA base station of the third embodiment, the local frequency signals which are used for converting to RF frequency and IF frequency are prescribed frequency signals that are each generated and output by a common signal generator and supplied to all communication antenna chains and the calibration chain. The number of calibrations can therefore be reduced and, in addition, the absolute value of the phase variation of the communication antenna chains can be detected.

In the third embodiment, the receive side first local frequency signal, the receive side second local frequency signal, the transmit side first local frequency signal and the transmit side second local frequency signal are each generated by a single common signal generator. Instead, however, it is possible, for example, to produce both the receive side first local frequency signal and the receive side second local frequency signal by using a frequency signal which is generated by a single common signal generator, to produce both the transmit side first local frequency signal and the transmit side second local frequency signal by using a frequency signal which is generated by a single common signal generator, or to generate all four of these local frequency signals by using a frequency signal which generated by a single common signal generator.

The third embodiment is equipped with common signal generators for supplying common local frequency signals to all communication antenna chains and the calibration chain. Instead, however, it is possible, for example, to provide common signal generators for supplying common local frequency signals to all of the communication antenna chains but not to the calibration chain.

Fourth Embodiment

A CDMA base station according to a fourth embodiment of the present invention will now be explained.

The CDMA base station of the fourth embodiment intermittently performs receive calibration, transmit calibration and the like in a configuration like that of the first or second embodiment. In the fourth embodiment, since the calibration signal is transmitted intermittently, it is possible in a case where the calibration signal is a cause of interference in the communication antenna chains to avoid constant transmission of the calibration signal that is the source of the interference. As a result, the reception quality can be improved.

The calibration also corrects for a change from the initial phase and amplitude owing to, for instance, secular and/or temperature change of analog components. Aside from the case where an abrupt temperature change is imparted from the exterior, such changes do not occur rapidly but progress slowly over several hours.

Only a few seconds are generally needed to detect phase and gain errors. Continuous calibration is therefore not absolutely necessary, and calibration that is performed by intermittent operation is usually adequate. Adoption of such intermittent operation is advantageous in that it mitigates the interference that the calibration signals from the CDMA base station impart to the mobile stations and the interference that the DMA base station receives from the calibration signals.

Thus, in the CDMA base station of the fourth embodiment, the reception and transmission of calibration signals by the communication antennas and the detection and other processing of the calibration information are carried out at intervals. The level of the interference that the communication signals of the CDMA base station and the mobile stations receive from the calibration signals during this processing is therefore reduced. As a result, the communication quality of the communication signals can be improved.

Fifth Embodiment

A CDMA base station according to a fifth embodiment of the present invention will now be explained.

The CDMA base station of the fifth embodiment is a CDMA base station configured in the manner of any of the first to fourth embodiments, for example, which has been adapted to utilize W-CDMA.

The world standard for the next-generation mobile communication system known as W-CDMA includes the use of the adaptive array antenna as a specification option, making adaptive array antenna utilization possible at the discretion of the operator. Application of the communication device of the present invention to W-CDMA base stations makes it possible to structure a cellular telephone network that can, as explained in the foregoing, enhance calibration accuracy, improve the communication quality of communication signals, and lower the unit price of transceiver units to thereby reduce the cost of building the network infrastructure.

Thus, the CDMA base station of the fifth embodiment, in being preferably applied to W-CDMA, enables a reduction in the cost of providing network infrastructure and, as such, lowers the financial burden on a large number of users.

The communication device of the present invention is not limited to the arrangements and configurations described in the foregoing but can be modified in various ways.

The present invention is not limited to the field of application described in the foregoing but can also be applied in various other fields. While the present invention was, by way of example, described with respect to application to a base station adopting the CDMA system, the present invention can also be applied to communication equipment utilizing other communication systems. Moreover, the communication device of the present invention can be used as any of a receiver for receiving signals, a transmitter for transmitting signals, and a transceiver for transmitting and receiving signals.

Further, the various types of processing carried out in the communication device of the present invention can, for example, be conducted by physical means equipped with a processor, memory and the like, wherein the processor controls the processing by executing a control program stored in a ROM. Otherwise, the various types of processing carried out in the communication device or the control program of the present invention can be conducted by independent physical circuits constituting functional means for executing the different processing operations.

Moreover, the present invention can be construed as being constituted of the aforesaid control program or of a floppy disk, CD-ROM or other computer-readable recording medium storing the control program, and the processing according to the present invention can be carried out by loading the control program from the recording medium into a computer and executing the control program by use of the processor.

As explained in the foregoing, the present invention provides a communication device wherein, during transmission and reception of signals using a communication antenna, information regarding the signal characteristics of a calibration signal contained in a signal that is received by the communication antenna is detected, and calibration of a communication antenna chain is performed based on the detected signal characteristic information. In this process, a cancellation signal corresponding to a calibration signal that is contained in the signal which is received by the communication antenna is generated based on the calibration signal, the generated cancellation signal is subtracted (removed) from the signal that is received by the communication antenna, and the received signal which is diminished by the cancellation signal or a signal substantially identical to the calibration signal is processed. Therefore, the calibration accuracy is enhanced and the reception quality of communication signals improved.

In one aspect of the present invention, the communication device of the present invention is preferably equipped with a calibration signal transmitting antenna for transmitting a calibration signal to the communication antenna. The calibration efficiency is therefore improved.

In another aspect of the present invention, the communication device of the present invention is equipped with calibration signal transmitting means for transmitting a calibration signal from a communication antenna and a calibration signal receiving antenna for receiving the calibration signal that is transmitted from the communication antenna. Information regarding the signal characteristics of the calibration signal that is received by the calibration signal receiving antenna is detected, and the communication antenna chain is calibrated based on the detected signal characteristic information. Calibration can therefore be performed based on the calibration signal that is received from the communication antenna.

In another aspect of the present invention, the communication device is equipped with a signal generator for generating a signal of a prescribed frequency for converting signal frequency, and the frequency signal that is generated by the signal generator is supplied to multiple antenna chains including all communication antenna chains. Therefore, unlike the case of using different signal generators for the individual antenna chains, for example, no phase shift arises in the frequency signal between the antenna chains. This improves the calibration accuracy.

In another aspect of the present invention, the reception and transmission of calibration signals by the communication antennas and the detection of information relating to the signal characteristics of the calibration signal are carried out at intervals. As a result, the communication quality of the communication signals is enhanced and the transmission quality of communication signals which are transmitted to other parties is improved.

What is claimed is:

1. A communication device for transmitting and/or receiving signals by using a communication antenna, said communication device comprising:

signal characteristic information detection means for detecting information regarding signal characteristics of a calibration signal contained in a signal received by the communication antenna;

calibration means for calibrating a communication antenna chain based on the signal characteristic information detected by said signal characteristic information detection means;

calibration signal cancellation means for removing a signal identical or substantially identical to the calibration signal from the signal received by the communication antenna; and receive signal processing means for processing the received signal which is diminished by the signal identical or substantially identical to the calibration signal.

2. A communication device according to claim 1, further comprising a calibration signal transmitting antenna for transmitting a calibration signal to the communication antenna.

3. A communication device according to claim 1, further comprising:

calibration signal transmitting means for transmitting a calibration signal from a communication antenna; and a calibration signal receiving antenna for receiving the calibration signal transmitted from the communication antenna;

wherein said signal characteristic information detection means detects information regarding the signal characteristics of the calibration signal received by said calibration signal receiving antenna, and said calibration means calibrates the communication antenna chain based on the signal characteristic information detected by said signal characteristic information detection means.

4. A communication device according to claim 2, further comprising:

calibration signal transmitting means for transmitting a calibration signal from a communication antenna; and a calibration signal receiving antenna for receiving the calibration signal transmitted from the communication antenna;

wherein said signal characteristic information detection means detects information regarding the signal characteristics of the calibration signal received by said calibration signal receiving antenna, and said calibration means calibrates the communication antenna chain based on the signal characteristic information detected by said signal characteristic information detection means.

5. A communication device according to claim 1, further comprising a signal generator for generating a signal of a prescribed frequency for converting signal frequency, wherein a frequency signal generated by a common signal generator is supplied to multiple antenna chains including all communication antenna chains.

6. A communication device according to claim 2, further comprising a signal generator for generating a signal of a prescribed frequency for converting a signal frequency, wherein a frequency signal generated by a common signal generator is supplied to multiple antenna chains including all communication antenna chains.

7. A communication device according to claim 3, further comprising a signal generator for generating a signal of a prescribed frequency for converting a signal frequency, wherein a frequency signal generated by a common signal generator is supplied to multiple antenna chains including all communication antenna chains.

8. A communication device according to claim 4, further comprising a signal generator for generating a signal of a prescribed frequency for converting a signal frequency, wherein a frequency signal generated by a common signal generator is supplied to multiple antenna chains including all communication antenna chains.

9. A communication device according claim 1, wherein the communication antenna performs transmission/reception of a calibration signal and said signal characteristic information detection means performs detection of information regarding signal characteristics of the calibration signal at intervals.

10. A communication device according claim 2, wherein the communication antenna performs transmission/reception of a calibration signal and said signal characteristic information detection means performs detection of information regarding signal characteristics of the calibration signal at intervals.

11. A communication device according claim 3, wherein the communication antenna performs transmission/reception of a calibration signal and said signal characteristic information detection means performs detection of information regarding signal characteristics of the calibration signal at intervals.

12. A communication device according claim 4, wherein the communication antenna performs transmission/reception of a calibration signal and said signal characteristic information detection means performs detection of information regarding signal characteristics of the calibration signal at intervals.

13. A communication device according claim 5, wherein the communication antenna performs transmission/reception of a calibration signal and said signal characteristic information detection means performs detection of information regarding signal characteristics of the calibration signal at intervals.

14. A communication device according claim 6, wherein the communication antenna performs transmission/reception of a calibration signal and said signal characteristic information detection means performs detection of information regarding signal characteristics of the calibration signal at intervals.

15. A communication device according claim 7, wherein the communication antenna performs transmission/reception of a calibration signal and said signal characteristic information detection means performs detection of information regarding signal characteristics of the calibration signal at intervals.

16. A communication device according claim 8, wherein the communication antenna performs transmission/reception of a calibration signal and said signal characteristic information detection means performs detection of information regarding signal characteristics of the calibration signal at intervals.

17. A CDMA base station comprising:

n number of communication antennas constituting an adaptive array antenna, n being greater than 1;

n number of transceiver units;

n number of calibration signal cancellers, said n number of communication antennas, said n number of transceiver units, and said n number of calibration signal cancellers constituting n number of communication antenna chains; and a user-segregated AAA signal processor and discriminator which is common to said n number of communication antenna chains, wherein:

each calibration signal canceller includes a despreader, a phase/gain error detector, a calibration signal generator, a complex multiplier and a subtracter;

each communication antenna is operable to transmit and receive spread spectrum signals to and from mobile stations by radio;

each transceiver unit is operable to conduct receive processing consisting of frequency-converting and orthogonally detecting received signals acquired from the associated communication antenna and outputting the result of the orthogonal detection to the associated calibration signal canceller, and to conduct transmit processing consisting of orthogonally modulating and frequency-converting a transmit signal received from the associated calibration signal canceller and outputting the result to the associated communication antenna;

for each calibration signal canceller, said despreader is operable to acquire the received signal from the associated communication antenna, to despread the received signal by using a spreading code corresponding to the calibration signal, thereby detecting the calibration signal contained in the received signal, and to output the detection result to the associated phase/gain error detector, wherein said associated phase/gain error detector is operable to detect the phase variation and gain variation of the calibration signal based on the detection result received from said despreader, to delete the phase component of the calibration signal produced on the calibration signal transmission side from the received calibration signal, and to output the result after deletion to the associated complex multiplier, the associated calibration signal is operable to generate a signal identical to the calibration signal transmitted from the calibration signal transmission side and to output the generated signal to the associated complex multiplier, said associated complex multiplier is operable to complex-multiply the result after deletion received from said associated phase/gain error detector and the generated signal received from said associated calibration signal generator, and to output the multiplication result to the associated subtracter as a cancellation signal, said associated subtracter is operable to subtract the cancellation signal received from said associated complex multiplier from the received signal of the associated communication antenna chain input thereto by the associated transceiver unit, and to output the received signal after subtraction to said user-segregated AAA signal processor and discriminator; and said user-segregated AAA signal processor and discriminator is operable to conduct receive processing consisting of acquiring the received signals of the communication antenna chains from the calibration signal cancellers, multiplying the received signals of the communication antenna chains and receive weights which are applied to said communication antenna chains, and synthesizing the multiplication results for all communication antenna chains so as to produce a synthesis result that is a received signal of said adaptive array antenna, wherein the receive processing is performed for every mobile station, conduct transmit processing consisting of modulating user specific data for X' number of users, summing the modulated signals so as to produce transmit signals, and multiplying the transmit signals and transmit weights which are applied to said communication antenna chains, and output the multiplication results for the respective communication antenna chains to said transceiver units via said calibration signal cancellers.

18. The CDMA base station according to claim 17, further comprising:

a calibration signal transmitting/receiving antenna;

a calibration signal transceiver unit; and a calibration signal processor, wherein:

said calibration signal processor includes a calibration signal generator, a spreading code generator, a despreader, a phase/gain error detector and a controller;

said calibration signal transmitting/receiving antenna is operable to radio-transmit a calibration signal input thereto from said calibration signal transceiver unit and to output signals received by radio transmission to said calibration signal transceiver unit;

said calibration signal transceiver unit is operable to receive the calibration signal from said calibration signal processor, orthogonally modulate and frequency-convert the received calibration signal, and output the modulated and frequency-converted calibration signal to said calibration signal transmitting/receiving antenna, and acquire received signals from said calibration signal transmitting/receiving antenna, frequency-convert and orthogonally detect the received signals, and output the result of the orthogonal detection to said calibrating signal processor;

in a transmission system of said calibration signal processor, when performing receive calibration of a communication antenna chain, said calibrating signal generator is operable to operate under the control of said controller so as to generate a fixed spreading code as a calibration signal and to output the calibration signal to said calibration signal transceiver unit; and in a reception system of said calibration signal processor during transmit calibration of a communication antenna chain upon reception of a calibration signal among calibration signals transmitted in turn from said communication antenna chains, said controller is operable to instruct said spreading code generator to generate a spreading code corresponding to the received calibration signal, and said spreading code generator is operable to operate under the control of said controller so as to generate the instructed spreading code and output the generated spreading code to said despreader said calibration signal processor, said despreader said calibration signal processor is operable to correlate the received signal acquired from said calibration signal transceiver unit and the spreading code supplied by said spreading code generator, and said phase/gain error detector is operable to detect the phase variation and gain variation of the calibration signal based on the despreading result received from said despreader said calibration signal processor.

19. The CDMA base station according to claim 18, wherein:

a receiver unit of each communication antenna chain includes a low noise amplifier, a mixer, a band pass filter, an auto gain controller, an orthogonal detector, and low pass filters;

a transmitter unit of each communication antenna chain includes low pass filters, an orthogonal modulator, a band pass filter, a mixer, a band pass filter, and a power amplifier;

a calibration chain transmitter unit comprises low pass filters, an orthogonal modulator, a band pass filter, a mixer and a band pass filter;

a calibration chain receiver unit comprises a mixer, a band pass filter, an orthogonal detector, and low pass filters;

said mixers of said receiver units of said communication antenna chains and said mixer of said calibration chain transmitter unit are supplied with a receive side first local frequency signal generated by a common first signal generator, and said orthogonal detectors of said receiver units of said communication antenna chains and said orthogonal modulator of said calibration chain transmitter unit are supplied with a receive side second local frequency signal generated by a common second signal generator; and said orthogonal modulators of said transmitter units of said communication antenna chains and said orthogonal detector of said calibration chain receiver unit are supplied with a transmit side first local frequency signal generated by a common third signal generator, and said mixers of said transmitter unit of said communication antenna chains and said mixer of said calibration chain receiver unit are supplied with a transmit side second local frequency signal generated by a common fourth signal generator.

* * * * *